(12) United States Patent
Schurch

(10) Patent No.: US 6,174,065 B1
(45) Date of Patent: Jan. 16, 2001

(54) MODULAR ILLUMINATED PANEL DISPLAY SYSTEM

(76) Inventor: Paul Schurch, 1324 Cacique St., Santa Barbara, CA (US) 93103

(*) Notice: Under 35 U.S.C. 154(b), the term of this patent shall be extended for 0 days.

(21) Appl. No.: 09/286,314

(22) Filed: Apr. 5, 1999

(51) Int. Cl.[7] ................................................. F21V 7/04
(52) U.S. Cl. ......................... 362/31; 362/559; 362/581; 362/125; 362/367; 362/812
(58) Field of Search ............................... 362/27, 31, 559, 362/576, 581, 125, 367, 812; 40/541, 542, 546, 547; 52/204.5, 205.55, 204.591, 204.593, 204.595, 204.65, 204.7, 204.72

(56) References Cited

U.S. PATENT DOCUMENTS

| | | | |
|---|---|---|---|
| 3,892,959 | 7/1975 | Pulles | 240/1 EL |
| 4,333,295 | * 6/1982 | Janke | 52/730 |
| 4,385,343 | 5/1983 | Plumly | 362/31 |
| 4,475,298 | 10/1984 | Munoz | 40/546 |
| 4,481,729 | 11/1984 | Weiller | 40/606 |
| 4,738,043 | 4/1988 | Ernst | 40/618 |
| 4,742,633 | 5/1988 | Snediker | 40/607 |
| 4,996,809 | * 3/1991 | Beard | 52/200 |
| 5,027,258 | 6/1991 | Schöniger et al. | 362/31 |
| 5,265,357 | * 11/1993 | Yu | 40/152.2 |
| 5,283,968 | 2/1994 | Williams | 40/546 |
| 5,381,309 | * 1/1995 | Borchardt | 362/31 |
| 5,390,436 | 2/1995 | Ashall | 40/546 |
| 5,561,960 | 10/1996 | Minnick et al. | 52/578 |
| 5,572,818 | 11/1996 | Churchill | 40/547 |
| 5,615,501 | 4/1997 | Rice | 40/205 |
| 5,692,330 | 12/1997 | Anderson, Jr. | 40/505 |
| 5,723,843 | 3/1998 | Muggli | 219/121.69 |

* cited by examiner

Primary Examiner—Sandra O'Shea
Assistant Examiner—Ismael Negron
(74) Attorney, Agent, or Firm—Stephen D. Carver

(57) ABSTRACT

A modular display rack comprises a plurality of removable, translucent panels that can be edge-illuminated by a captivated fiber optic lighting system. In the best mode, the system forms a single rack, although two or more racks can be combined side by side. The translucent, etched glass panels are maintained in a selected three-dimensional orientation, for colorfully displaying selected written or pictorial indicia or artwork, by rail assemblies between which they extend. The rail assemblies comprise stacked, modular parts that may be snap-fitted together by the user. In the best mode a decorative trim piece having a convex or profiled top mounts upon a lower rail. In another alternative embodiment, wherein layers of panels are deployed, a stack of rails is used instead of a single rail. Each rail is secured to a lower shoe, that is fastened to a baseplate or a supporting surface. Pins projecting from the shoes lock within rail keys, and pins projecting from the rails lock within trim piece keys. Another alternative embodiment omits all rails—it deploys a decorative trim piece that is directly-coupled to a shoe to hold a single layer of panels. The panels are sandwiched between adjacent rail layers, secured by pegs and pins. A light source provided by a fiber-optic light stick captivated within the rail assembly radiates light towards the edges of the adjacent panels for illumination. In the best mode a translucent backplate beneath the panels is also illuminated.

24 Claims, 13 Drawing Sheets

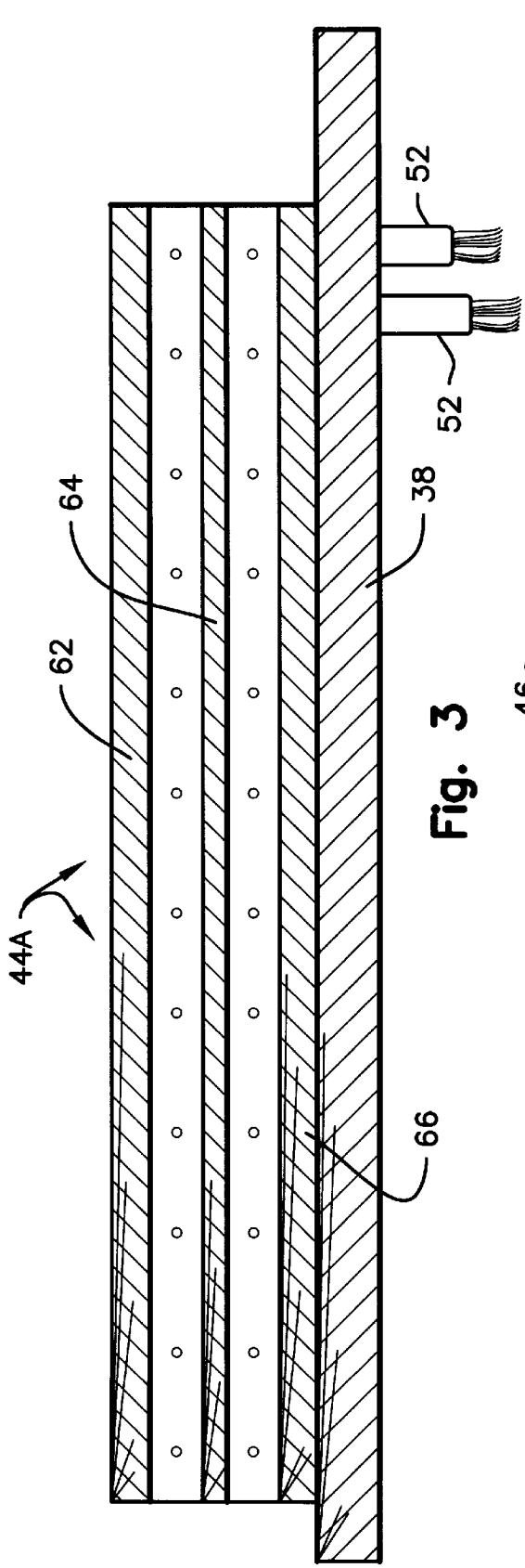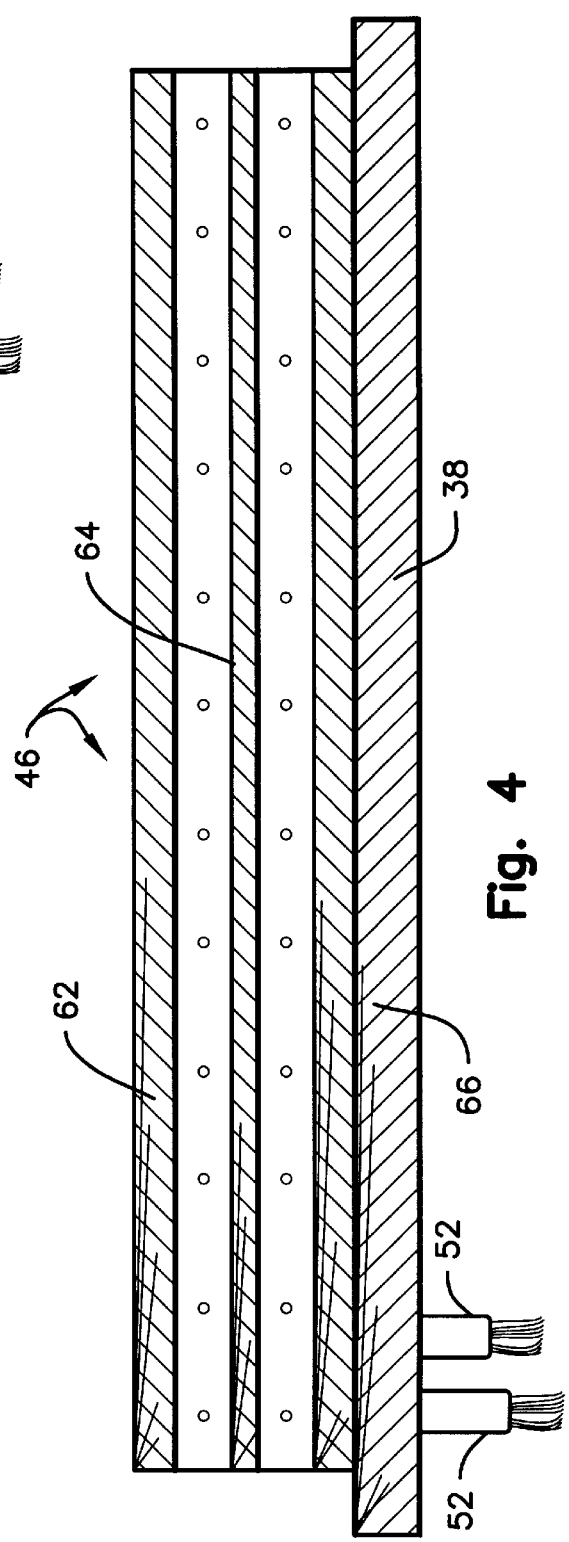

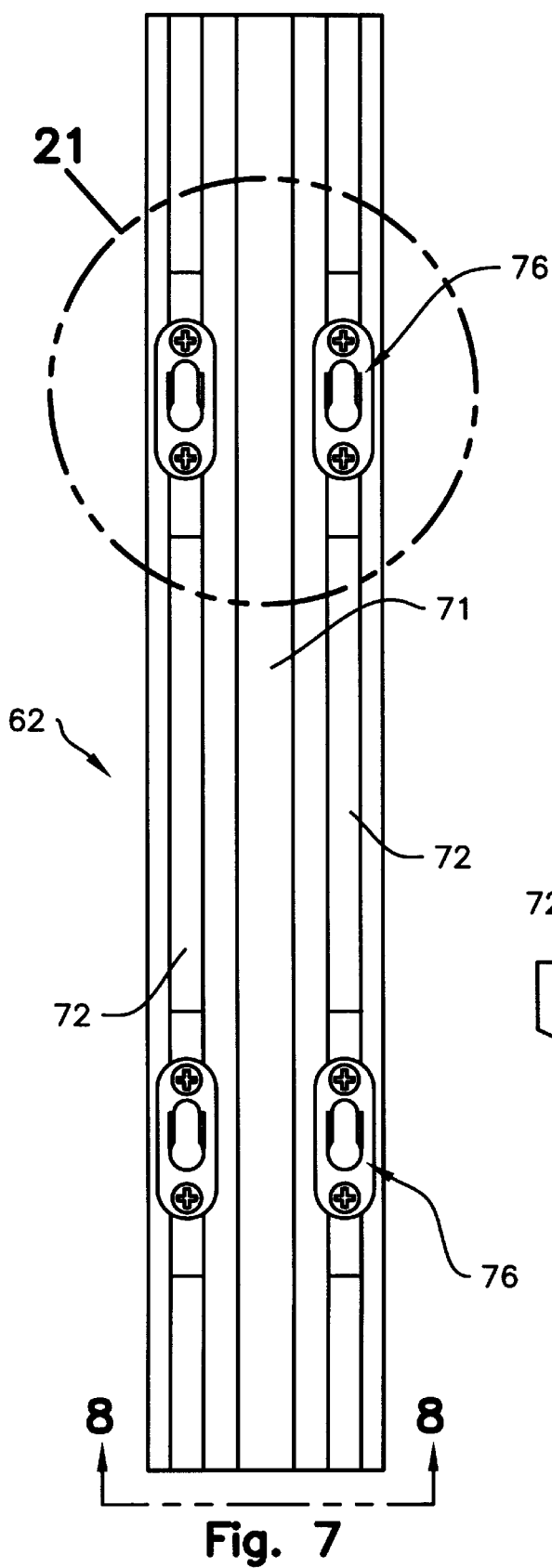
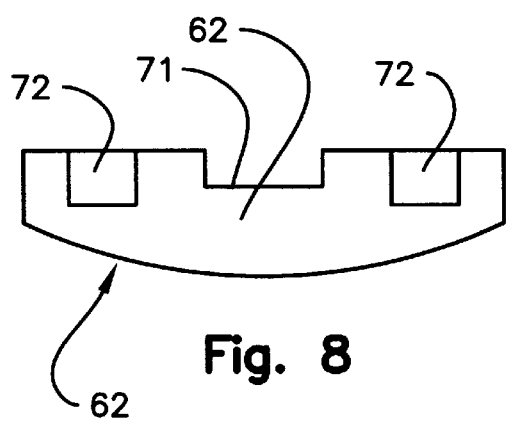
Fig. 7
Fig. 8

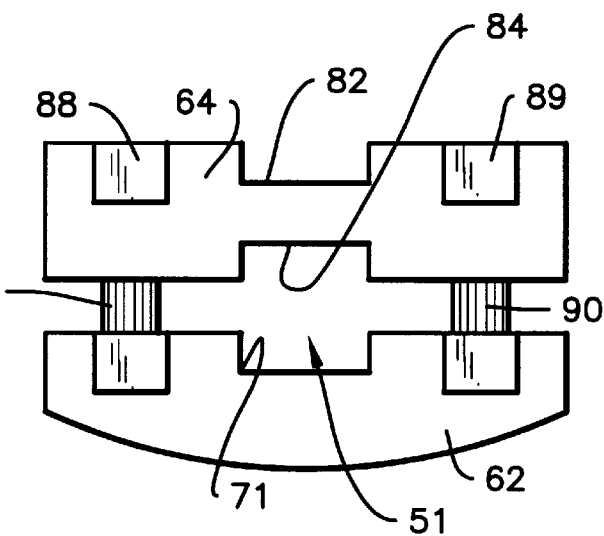
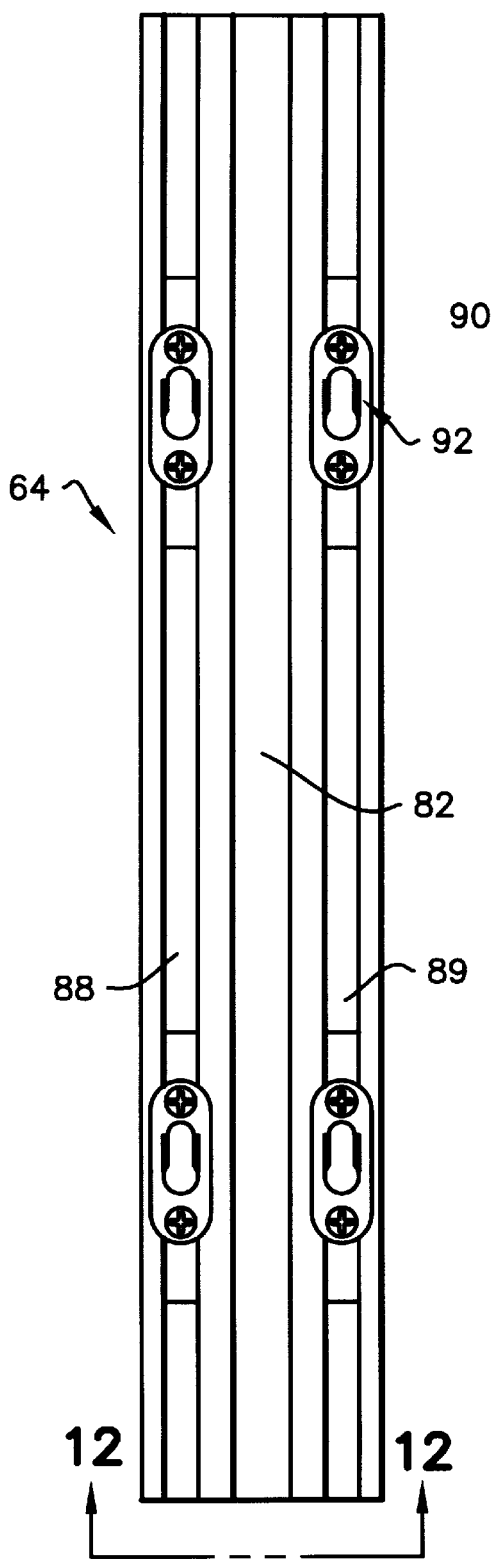
Fig. 11

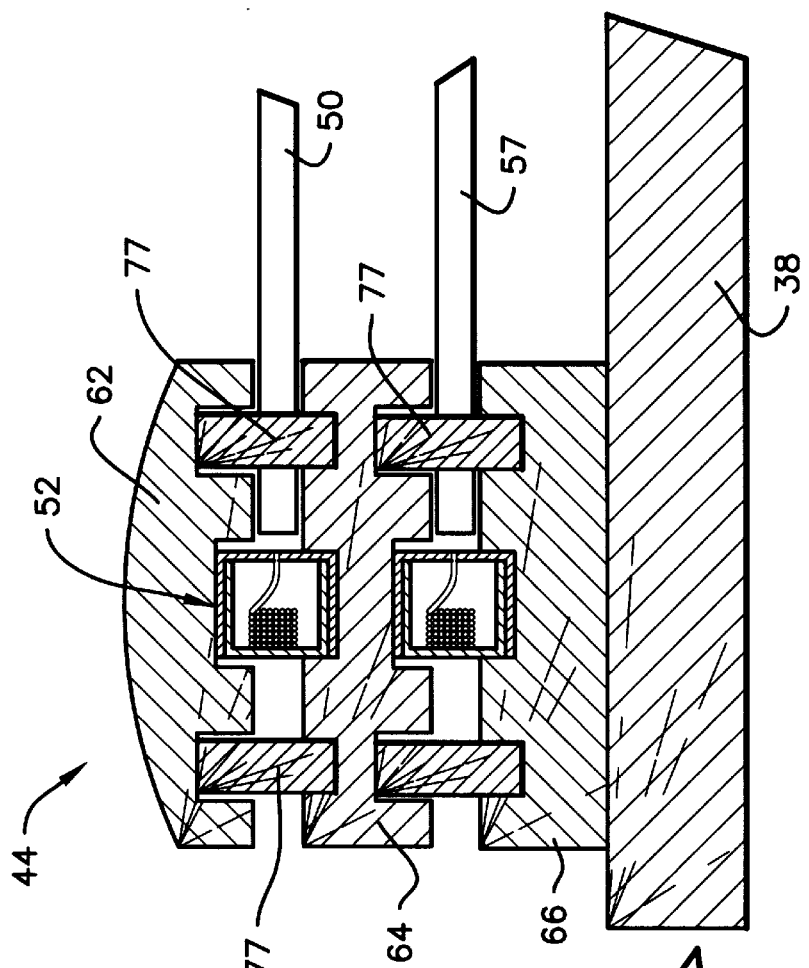
Fig. 23
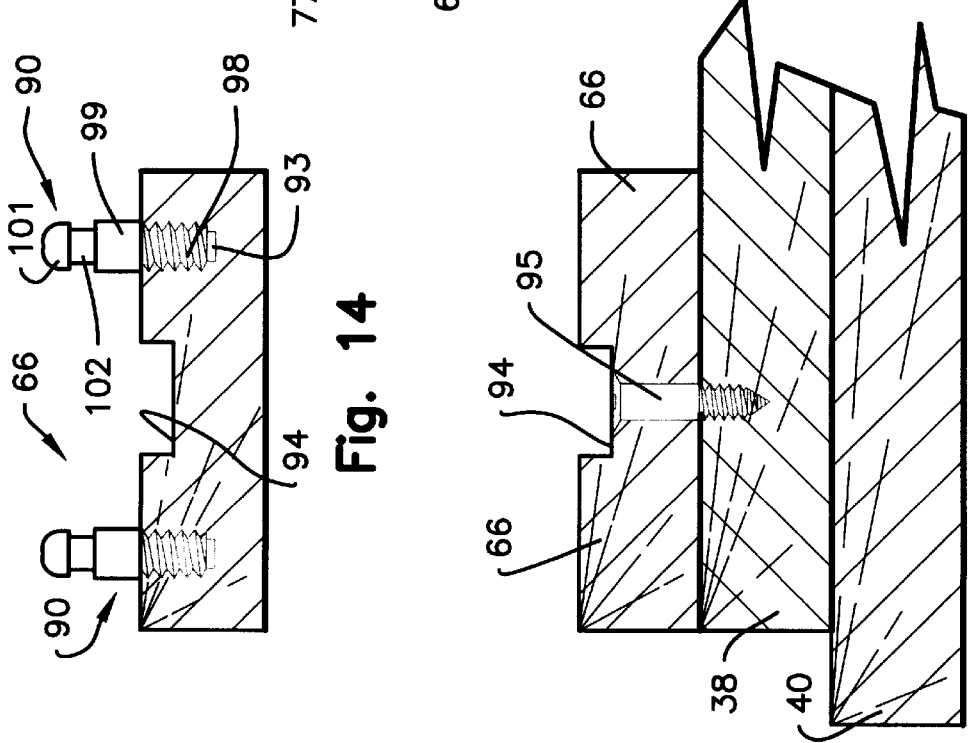
Fig. 14
Fig. 13

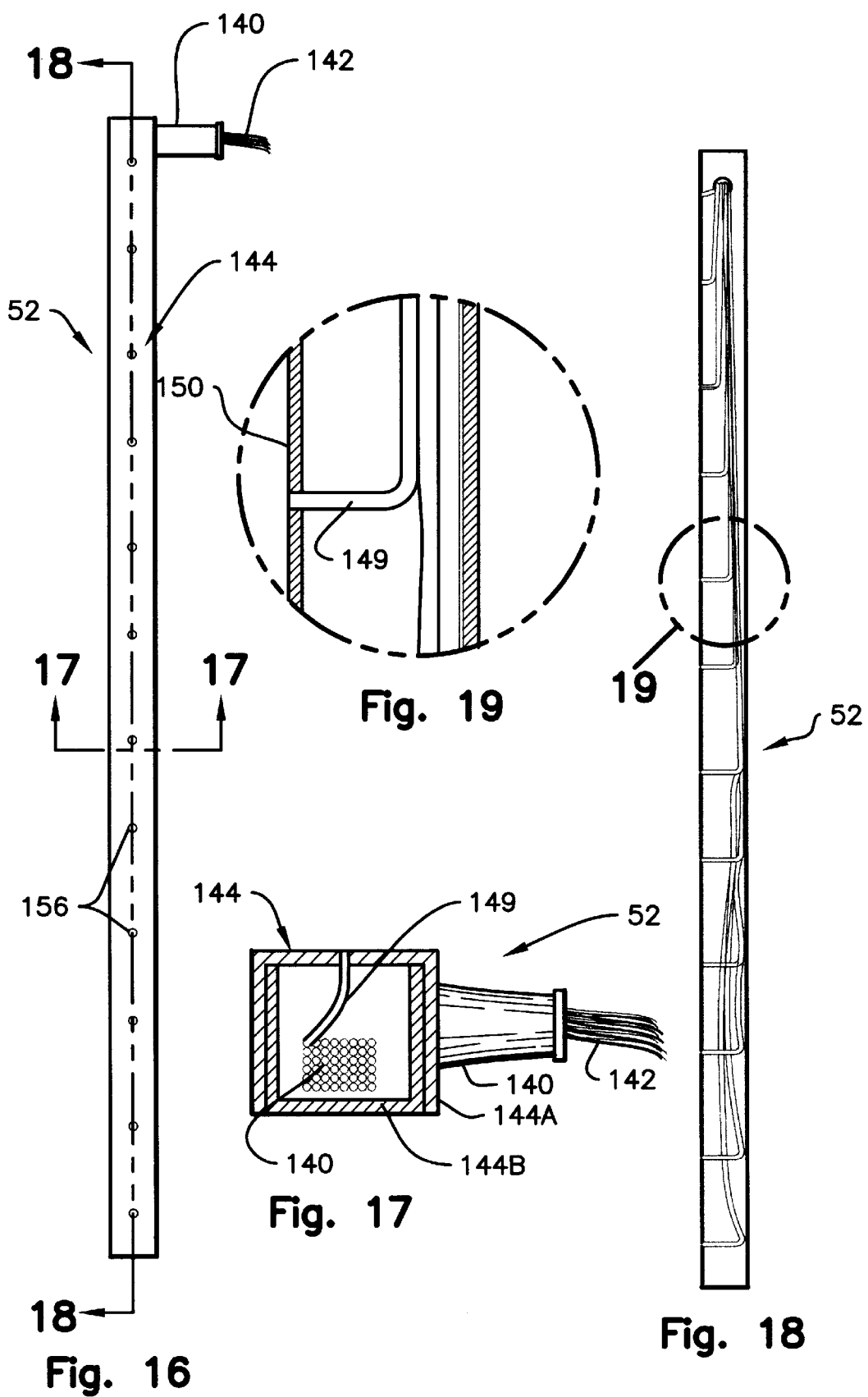

MODULAR ILLUMINATED PANEL DISPLAY SYSTEM

BACKGROUND OF THE INVENTION

I. Field of the Invention

The present invention relates generally to multi-panel display systems in the form of signs, plaques, racks or the like. More particularly, my invention relates to display systems that comprise a plurality of illuminated, translucent panels. Prior art relevant to this invention is found in United States Patent Class 40, Subclasses 546 and 547.

II. Description of the Prior Art

A wide variety of illuminated signs are known in the art. Various display systems comprising boards or frames that are covered by one or more translucent panels are known. Known display systems are commonly illuminated with internal or external lights of either incandescent or fluorescent design. Modem display systems incorporating translucent materials including inexpensive glass, and plastic panels have become relatively successful. The relatively, planar, panels may be removed and reattached as desired to shield lettering or other pictorial indicia protected within the device framework. Often the panels are disposed in the form of rows or stacks, being coupled to each other with various clips or retainers. Alternatively, the panels may be captivated within supporting grooves of the frame structure, or they may be ruggedly secured with fasteners to mounting rails or the like.

Known signs may be edge-illuminated by directing light along the periphery of one or more translucent panels. Light impinging upon panel edges is distributed throughout and along the display, illuminating the interior and signs or indicia disposed between or below the illuminated panels. Such designs avoid concentrating light unevenly. As light is regularly and uniformly distributed, unwanted dark regions often exhibited by earlier, illuminated sign systems are avoided. As a result, the written or pictorial materials contained within the display are evenly brightened to provide a relatively futuristic and appealing "high-tech" appearance.

U.S. Pat. No. 5,561,960 shows panel structures using projecting pins that are captivated within receptive mounting slots for securing the panels U.S. Pat. Nos. 5,390,436, 5,572,818, 5,283,968, 5,027,258, 4,385,343 and 3,892,959 show display devices wherein translucent panels use edge illumination.

The basic concept of illuminating predetermined display indicia upon a translucent panel is seen in U.S. Pat. No. 4,475,298.

Multiple, vertically-spaced apart rectangular panels are shown in U.S. Pat. Nos. 4,738,043 and 5,692,330.

However, no known prior art display system is adapted to mount a plurality of translucent panels and desired written or pictorial indicia in spaced relation, at the same time illuminating the panels with one or more colors to produce a visually appealing, three dimensional effect. No known display rack system is adapted to interfit a plurality of differently illuminated panels in a user configurable arrangement that can be snap-fitted together in a minimal time.

SUMMARY OF THE INVENTION

This invention displays and illuminates information and/ or artwork preferably etched onto removable glass panels or plaques. It provides a user-configurable display system that may be configured in many different arrangements.

In the best mode, the system forms a single rack, although two or more racks can be combined side by side. Each display rack comprises a plurality of substantially translucent, etched glass panels disposed in a selected three-dimensional orientation, for colorfully displaying selected written or pictorial indicia or artwork. The panels may overlie desired signage, or written or pictorial material that is to be prominently displayed or exhibited. The numerous, generally rectangular panels may comprise translucent or semi-translucent plastic or glass, etched glass, opaque plastic or glass. Optionally they may include written or pictorial indicia formed (i.e., by etching or painting or with decals or attached posters) on their exposed surfaces.

Sides of the rack are formed by spaced-apart, and parallel rail assemblies. These are comprised of modular parts that may be erected by the user in a variety of configurations. An outer, optional decorative trim piece possibly comprises a convex outer top, or a profiled or fluted external top. The trim piece bottom comprises an elongated, central channel bounded by a pair of spaced apart and parallel clearance slots. Recessed locking keys are mounted periodically along the two clearance slots, adjacent the central channel. The trim piece mounts upon a lower rail. (In an alternative embodiment a stack of rails is employed).

Each rail comprises central top and bottom channels. A pair of parallel clearance slots, defined on both sides of the bottom channel, are aligned with locking pins projecting from the rails. there are periodic locking keys in the clearance slots underneath the rail. Preferably, the rail assemblies comprise shoes attached to the lowermost baseplate. The preferred shoes are somewhat simpler than the rails in design. Pins projecting upwardly from the shoes lock within the rail keys, and pins projecting upwardly from the rails lock within the trim piece keys.

Sides of the rack are formed by spaced-apart, and parallel rail assemblies. These are comprised of modular parts that may be erected by the user. An outer trim piece has a convex external top. At the bottom, an elongated, central channel is bounded by a pair of spaced apart and parallel clearance slots. Recessed locking keys are mounted periodically along the central channel. The trim piece mounts upon a lower rail. (In an alternative embodiment a stack of rails is employed). Each rail comprises central top and bottom channels. A pair of parallel clearance slots, defined on both sides of the bottom channel, are aligned with locking pins projecting from the rails. there are periodic locking keys in the clearance slots underneath the rail. Preferably, the rail assemblies comprise shoes attached to the lowermost baseplate. They are somewhat simpler than the rails in design. Pins projecting upwardly from the shoes lock within the rail keys, and pins projecting upwardly from the rails lock within the trim piece keys.

In the best mode panels are selectively edge-illuminated by a lighting system that is uniquely constrained within the modular assembly. When assembled, the system's fastening system holds a fiber optic light stick within the framework, radiating light towards the edges of panels that are firmly captivated adjacent the light stick in assembly. One or more layers of panels of varying dimensions may be employed. In the best mode a translucent glass backplate is disposed beneath the panels. At the users behest the backplate may instead be opaque, tinted or colored, or mirrorized. When the panels and/or the backplate are illuminated, ideally with a plurality of different colors, each display rack in the system exhibits sensually-pleasing, three dimensional effects.

In the best mode the light stick comprises an elongated length of square aluminum tubing that runs the full length of the column. A fiber optic illuminator directs high intensity light into the light stick. A plurality of light pathways within the light stick illuminate the spaced-apart orifices defined in the tubing. Light is thus directed towards the edges of the adjacent, translucent panels captivated within the assembled rack. Illumination of the proximate panel results. Where multiple panels are disposed over each other, different colors can be combined to produce different optical effects. If the light intensity must be adjusted, or less than the full number of optional panels are installed, various ones of the fiber optic outlets can be masked off with black electrician's tape so no light escapes. The fibers are connected from the illuminator through the conduit to the 'light stick' that is placed between the shoe and rail, and the rail and trim piece of the column.

Thus a basic object is to visually display information and/or artwork.

Another basic object is to provide a display that can optionally be illuminated.

Another object of my invention is attractively display information and/or artwork that is preferably etched or carved onto one or more layers of removable glass panels or plaques.

A related object is to illuminate one or more layers of panels in a display system of the character described.

A very general object of the invention is to provide a multi-panel display system that is very efficiently illuminated. It is a feature of my invention that edge illumination is employed by a light system shining on one or both edges of each illuminated panel.

A related object is to provide a user-configurable, modular display system in which the user may selectively deploy one or more translucent panels in each rack.

Another basic object is to provide an illuminated, modular display system comprising one or more display racks that can be custom configured by the user.

Thus a related object to is to display and possibly illuminate an array comprising only one layer of plaques or panels. It is a feature of my invention that in different modes, a single layer of panels could be sandwiched between a shoe and a rail, a rail and a trim piece, or a shoe and a decorative trim piece.

Another object of my invention is to display and illuminate information and/or artwork preferably etched onto removable glass panels or plaques.

Similarly, an object is to provide a modular display rack that allows the panels and lighting components to be easily removed or installed.

It is also an object that the assembled system conceal the inner workings of the lighting system when assembled properly, for aesthetic enhancement.

Another object is to provide a modular, display system of the character described in which one or more translucent panels may be deployed in a vertical stack.

It is also an object to provide a combination arrangement where two or more racks may be combined adjacent with one another to provide an enlarged display system if desired by the user. It is a feature of this invention that two or more rail assemblies may be assembled into one system.

Moreover, it is an object to provide an illuminated display system wherein layers of panels may be employed. It is a feature of this invention that the preferred rail mounting system can employ either a single rail, or a stack of multiple rails, that are sandwiched between the base shoe and the outer protective top, for edge-supporting projecting panels.

A very general object of the invention is to provide a multi-panel display system that is very efficiently illuminated. It is a feature of my invention that edge illumination is employed by a light system shining on both edges of each illuminated panel.

Yet another object is to provide a modular display rack that provides custom, user-configurable illumination options.

Another object of the invention is to provide a modular system of the character described with a highly efficient lighting system that may be configured by the user for a variety of different panel arrangements.

A related object is to provide a well lit, highly visible, illuminated sign that is capable of a variety of user-defined colors and visual effects.

Another basic object is to provide a display system that can illuminate the glass panels with different colors of light to increase readability and the depth of field.

Still another object is to provide an illuminated display or sign that avoids uneven lighting or dark areas.

Conversely, an important object is to provide an illuminated display in which the brightness can be moderated or even eliminated in selected panels by the user.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 3 is an enlarged, fragmentary sectional view taken along line 3—3 in FIG. 2;

FIG. 4 is an enlarged, fragmentary sectional view taken along line 4—4 in FIG. 2;

FIG. 7 is an enlarged, bottom plan view of a removed, decorative trim piece;

FIG. 8 is an enlarged, end elevational view of a preferred trim piece taken generally along line 8—8 in FIG. 7;

FIG. 11 is an enlarged, bottom plan view showing the underside of a removed rail still coupled to a trim piece;

FIG. 12 is an enlarged, end elevational view taken generally along line 12—12 in FIG. 11;

FIG. 13 is an enlarged, fragmentary sectional view taken along line 13—13 in FIG. 9, showing the preferred manner in which one or more system racks are mounted to a generally planar, supporting structure, with portions thereof omitted for clarity;

FIG. 14 is an enlarged, sectional view of a preferred shoe, taken generally along line 14—14 in FIG. 9, showing the preferred locking pin arrangement;

FIG. 16 is a plan view of the preferred light stick, showing light exit holes through which light may be directed into adjacent panel edges;

FIG. 17 is a greatly enlarged, fragmentary sectional view of the light stick taken along line 17—17 in FIG. 16;

FIG. 18 is a longitudinal sectional view taken along line 18—18 of FIG. 17 showing the light fibers exiting from the rear of the housing;

FIG. 19 is a greatly enlarged view of circled region 19 in FIG. 18 showing an individual fiber optic conductor within a light stick terminating in a light output orifice;

FIG. 23 is an enlarged, fragmentary sectional view taken generally along line 23—23 in FIG. 5;

DETAILED DESCRIPTION

Figure 1:
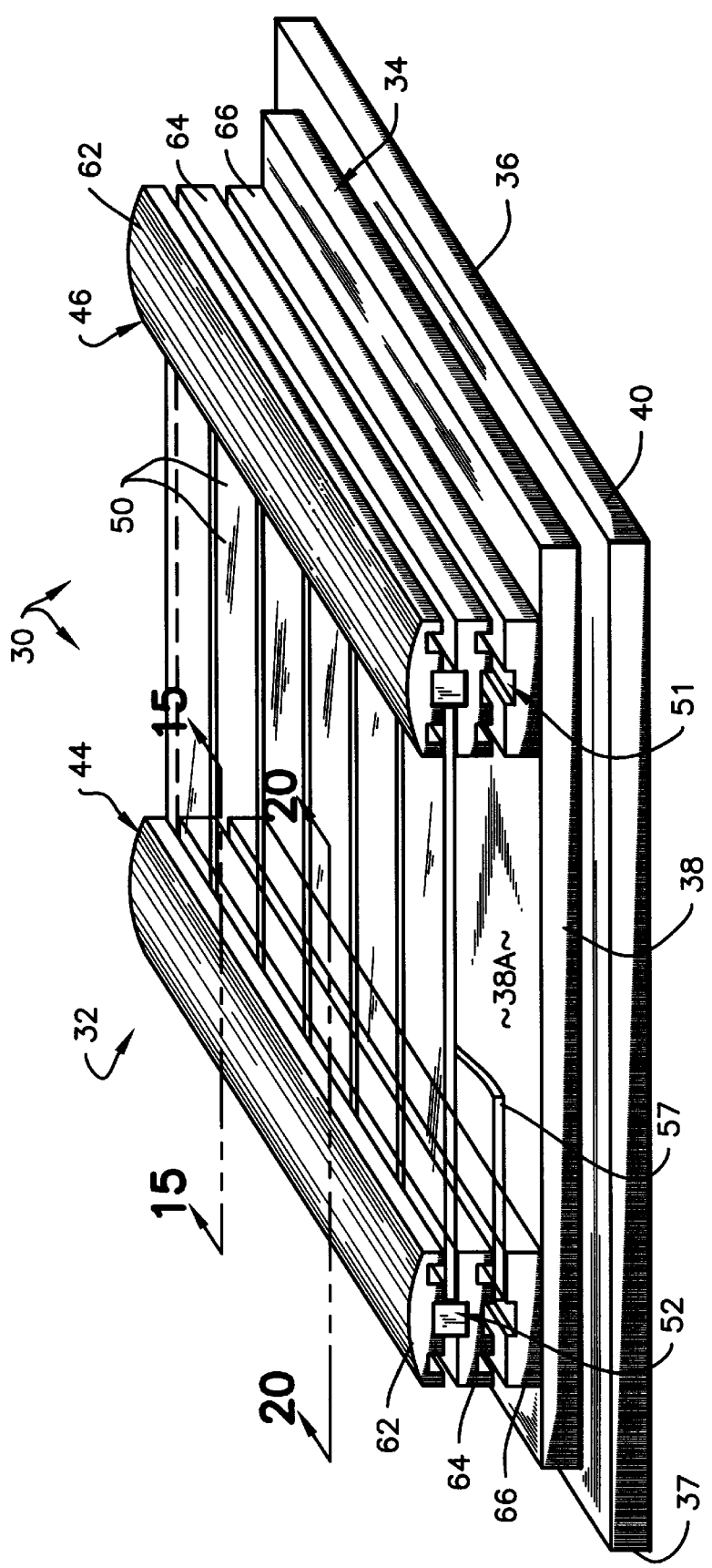
FIG. 1 is a partially, fragmentary, frontal isometric view of a fully assembled modular display system comprising a single rack, showing the best mode known to me at this time.
Figure 2:
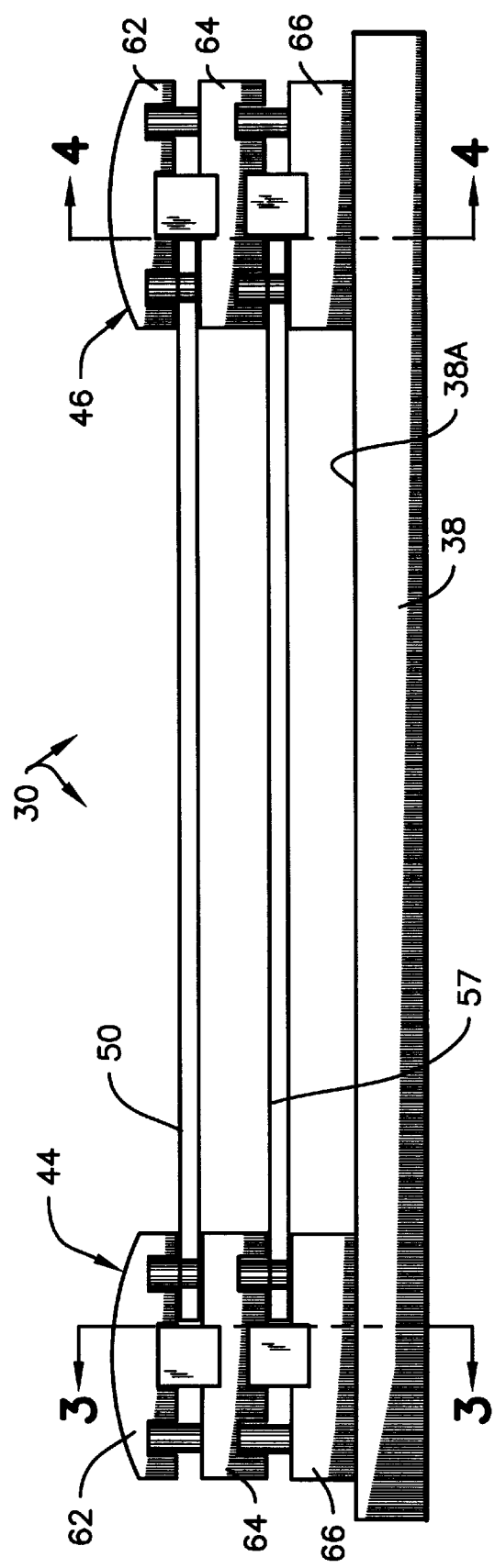
FIG. 2 is a fragmentary, bottom plan view of a preferred display rack, taken generally from a position beneath FIG. 1 looking forwardly.

With initial reference now directed to FIGS. 1–6, the best mode of my illuminated display rack system has been generally designated by the reference numeral 30. Rack system 30 comprises a pair of spaced-apart sides 32, 34 that generally correspond to the extreme side edges 36, 37 of an optional baseboard 38. It is recommended, but not mandatory, that the assembled rack system 30 be affixed to a supporting surface or wall 40 for viewing with or without a baseboard 38. A pair of spaced-apart, multi-part rail assemblies, built in accordance with the best mode, and respectively designated by the reference numerals 44 and 46, are disposed near the rack sides 32 and 34 in generally parallel relation.

The spaced-apart rail assemblies 44 and 46 cooperatively mount a plurality of removable panels or plaques 50. These panels preferably comprise small, rectangular, translucent pieces of glass, etched glass, or plastic. They extend horizontally over the upper surface 38A baseboard (FIG. 1) of the baseboard or existing wall. The display panels may be marked with artistic indicia, some form of writing, or other signage material to be displayed. In the best mode, the panels are illuminated by a lighting system 52 captivated within the rail assemblies 46, 44, to be described in detail hereinafter. In he best mode a generally rectangular and planar backplate 57 (FIGS. 1, 2 and 6) extends between the rail assemblies 44 and 46, beneath the panels 50 but above baseboard surface 38A. Backplate 57 may comprise translucent plastic or glass, an opaque or partially translucent material, or a mirrored surface. Optionally it may be marked with display indicia, artwork or the like. It can be edge-illuminated like the panels 50, as will hereinafter be explained, and its presence functionally enhances the aesthetically pleasing, three-dimensional appearance of the assembled, illuminated system.

Figure 15:
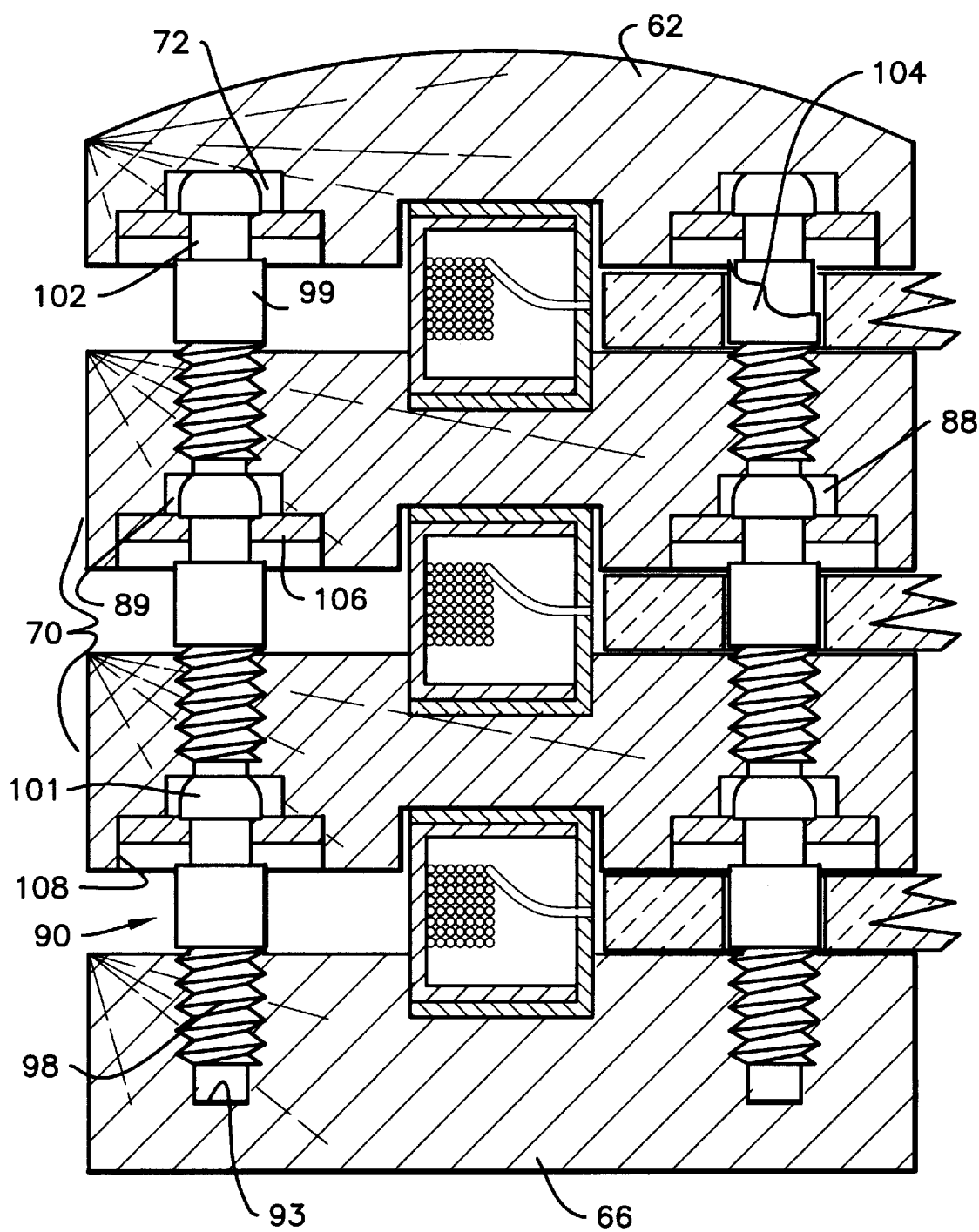
FIG. 15 is a greatly, enlarged, fragmentary sectional view of an alternative embodiment taken from a hypothetical position similar to line 15—15 in FIG. 1, but illustrating a rail assembly comprising a stack of individual rails, with edge portions of layered panels captivated therebetween.
Figure 20:
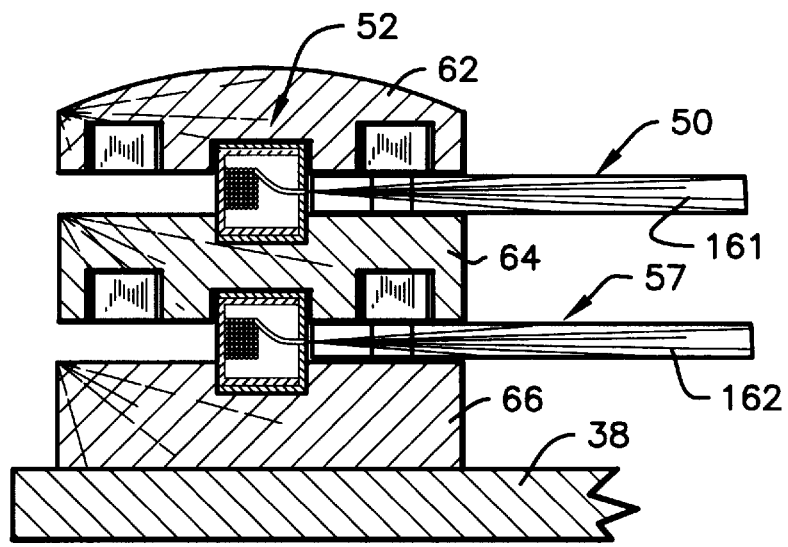
FIG. 20 is an enlarged, diagrammatic view of a side section of an assembled rail assembly, showing how light is directed towards the translucent panels.

In the best mode, the rack system 30 involves only the "single rack"0 arrangement seen in FIGS. 1–6. In this design, the preferred embodiment, a single layer of display panels 50 is disposed above a single backplate 57. In the preferred mode the panels 50 and backplate 57 extend between a pair of rail assemblies 44 and 46, but in an alternative mode (FIG. 22) to be discussed hereinafter, more than a pair of parallel rail assemblies may be combined, in effect resulting in an enlarged system with more than one single rack. Further, multiple layers of panels may be combined in an alternative system wherein the rail assemblies include an inner stack of rails, rather than a single rail (FIG. 15.) Moreover, it should be recognized by those skilled in the art that the width-wise combined version of FIG. 22 can be combined with the layered panels of FIG. 15. And, the teachings of this invention includes embodiments with or without structure corresponding to baseboard 38, and/or backplate 57.

Returning to FIGS. 1–4, the preferred rail assemblies systems 44, 46 are preferably affixed in parallel, spaced-apart relation upon the baseboard 38 or an alternative supporting surface. In a given embodiment, each rail assembly 44, 46 is constructed identically, although it may be deployed differently; therefore both need not be discussed in detail. Each rail assembly 44 is elongated, and forms the structural sides of a typical system rack 30 (FIG. 1). Each rail assembly comprises a plurality of cooperating, locking structures that sandwich edges of panels captivated therebetween. The top of each rail assembly is formed by an elongated, trim piece 62 having a decorative, outer convex surface 63 (FIG. 1) Either a single rail 64, or a stack of rails as will be described later, is disposed beneath the trim piece 62, upon the lowermost shoe 66. Where included, the backplate 57 is sandwiched between a shoe 66 and a rail 64. The panels 50 are similarly sandwiched between a trim piece 62 and a rail 64. An elongated cavity 51 results between the assembled trim piece 62 and rail 64, and between each shoe 66 and a rail 64. The preferred fiber-optic illumination light system 52 is disposed within and captivated by the cavity 51.

Of course, where a stack of panels is desired (FIG. 15) multiple layers of panels are sandwiched between corresponding layers in a rail stack 70. It will be apparent to those skilled in the art that since stacked, individual rails interfit symmetrically with one another, they can be piled on top of each other as much as is practicable as in FIG. 15 to produce multiple layers of various panels and/or backplates. This arrangement provide an opportunity to colorize various layers of panels differently to form an outstanding, sensually desirable, three dimensional effect.

With primary reference directed to FIGS. 7 and 8, a typical trim piece 62 is disclosed in detail. The convex other top surface 63 is merely decorative. The trim pieces are preferably made of wood, and decorative configurations of the outer surface 63 (FIG. 1) can be made. The underside (FIG. 7) of a trim piece has an elongated, central channel 71, bounded by a pair of spaced apart and parallel clearance slots 72. Periodically along the length of the clearance slots are recessed locking keys, generally designated by the reference numeral 76 to be described later. These keys interlock with portions of the metal pins that project upwardly from the rails to be discussed later. (As used herein the terms "pin" or "pins" collectively refer to the preferred metal locking pins used to fasten the side rail assemblies, and to the cheaper wooden pegs used to hold the glass panels). The rails 64 also have upwardly projecting wooden pegs 77 (FIG. 23) for penetrating the panels 50; slots 72 in the trim pieces "clears" these pegs to provide a fit.

Figure 24:
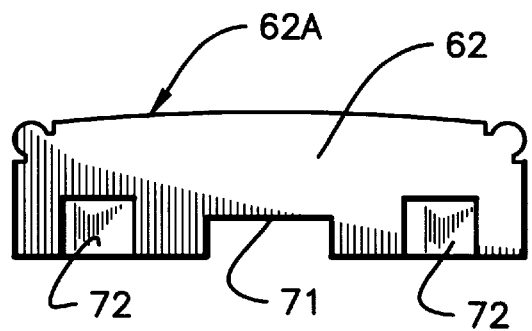
FIG. 24 is an end elevational view of an alternative trim piece.
Figure 25:
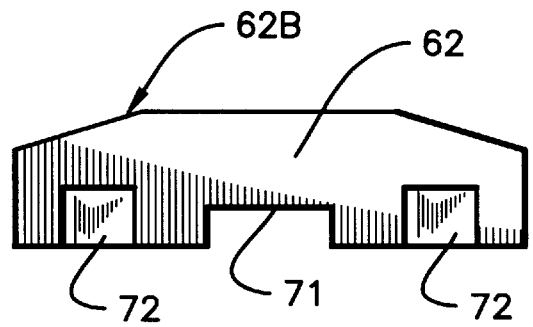
FIG. 25 is an end elevational view of an alternative trim piece.
Figure 26:
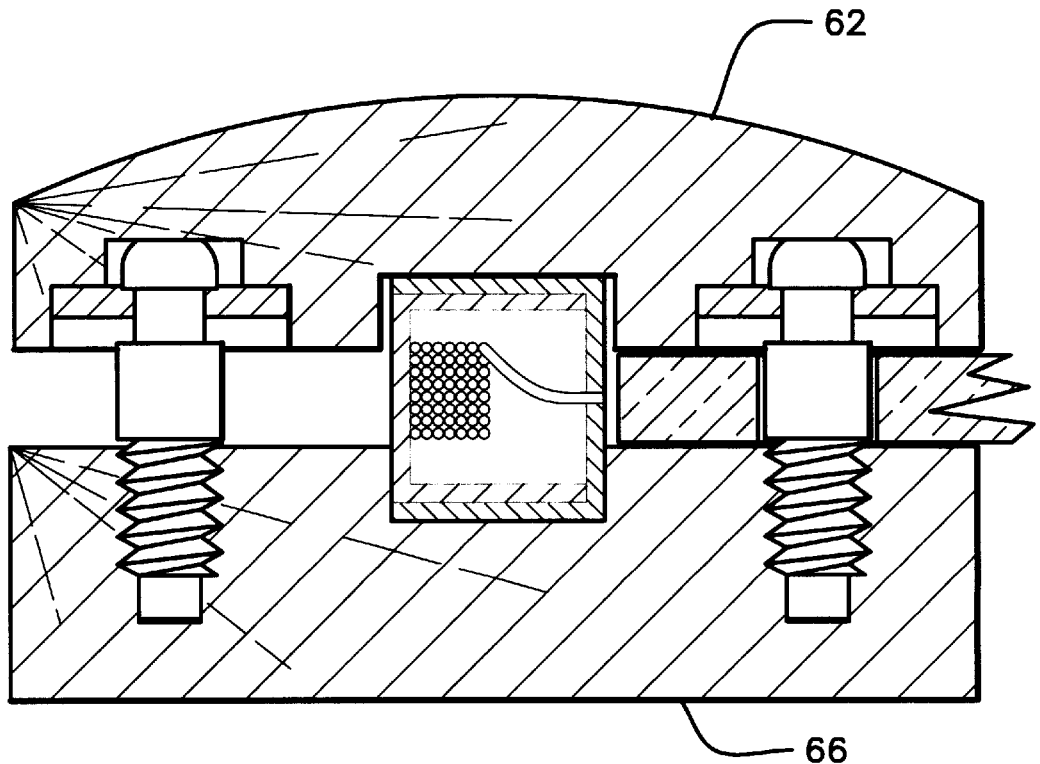
FIG. 26 is a view similar to FIG. 23, but showing how a single trim piece may be coupled to a shoe, captivating a sandwiched panel between the pieces, without a rail or rail stack.

Turning to FIG. 24, it will be appreciate that an alternative trim piece 62A may be configured with a different ornamental appearance. Similarly, FIG. 25 reveals another alternative trim piece 62B. FIG. 26 reveals that a trim piece 62 may alternatively be coupled directly to a lower shoe with the rail structure mentioned hereinafter omitted.

Turning next to FIGS. 11 and 12, each rail 64 comprises a central channel 82 defined in its bottom, and an aligned, symmetrical channel 84 defined in its top (FIG. 12). A pair of elongated, spaced apart and parallel clearance slots 88, 89 are defined on its bottom at either side of the central channel 82. These are aligned with the steel locking pins 90 (FIG. 12) projecting from the rails 64 to the adjacent trim piece 62. Again there are periodic locking keys 92 (FIG. 11) disposed along the length of the clearance slots at the rail underside as will be described hereinafter. As best seen in FIG. 12, with a trim piece 62 assembled together with a rail 64, channels 71 and 84 are aligned to form the cavity 51 that houses the lighting apparatus to be described later.

Figure 9:
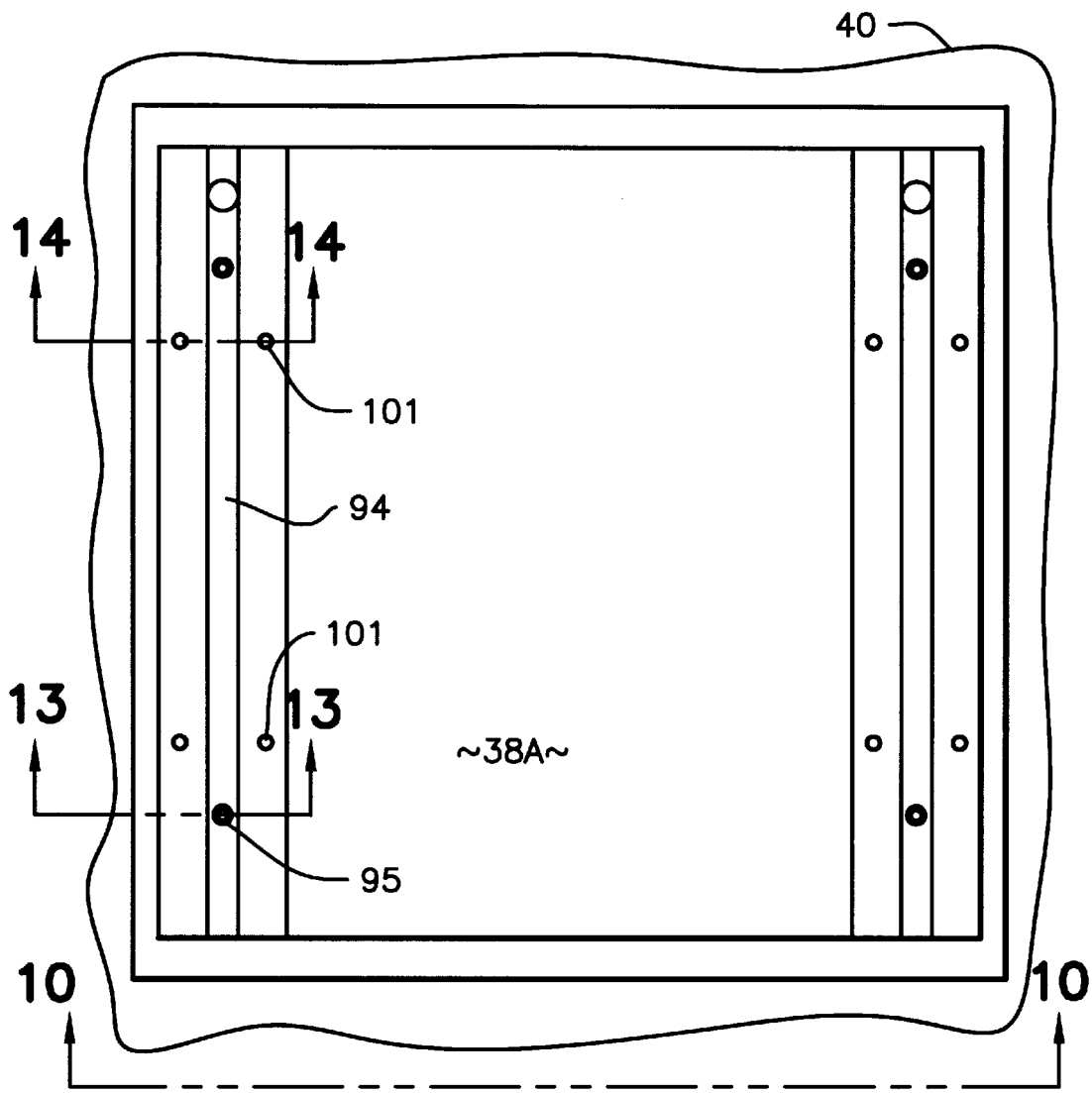
FIG. 9 is a partially fragmentary, front plan view of a preferred display rack showing it further partially disassembled, with the rails and decorative trim pieces on opposite sides removed from the exposed shoes.
Figure 10:
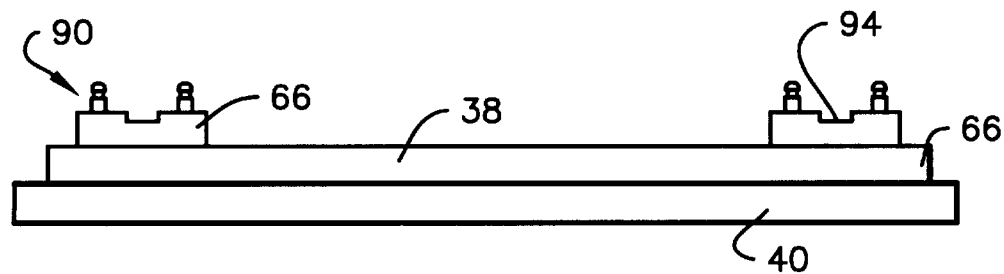
FIG. 10 is a bottom view of the dissembled rack of FIG. 9 taken generally along line 10—10 in FIG. 9, showing the baseboard and the shoes.

The preferred shoes 66 are somewhat simpler than the rails in design. They have a generally rectangular, transverse cross section (FIGS. 10, 14). Like the trim pieces and rails, they have a central channel 94. Suitable fasteners 95 (FIG. 13) disposed within the channel 94 fasten the shoes 66 to the baseboard 38 (or alternatively to a wall 40). Rows of steel locking pins 90 are symmetrically disposed on either side of channel 94 (FIGS. 9, 10, 14), seated within suitable tapped orifices 93 (FIGS. 14, 15). These pins are aligned with the clearance channels in the rails and trim pieces normally disposed above. Each steel lacking pin 90 has an integred, a threaded shank 98 screwed into the shoe (or the rail). A larger diameter boss 99 separates the integral shank 98 from the retaining cap 101 and the reduced diameter neck 102.

Figure 21:
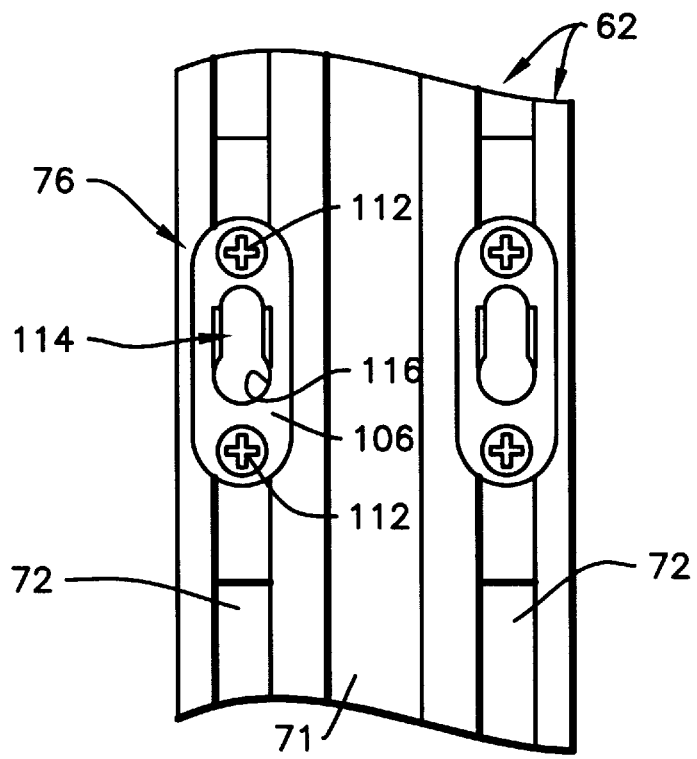
FIG. 21 is an enlarged plan view of region 21 in FIG. 7, showing the preferred locking key structure.

The preferred locking pins 90 mate with the locking keys 76 or 92, which are all identical. With combined reference to FIGS. 14, 15 and 21, a typical locking key comprises a slotted frame 106 (FIG. 21) shaped like an oval, that is seated within a recessed, counterbored region 108 (FIG. 15) defined periodically along the corresponding clearance slot 72 (FIG. 21). Fasteners 112 secure the key. A central follower slot 114 adjoins a circular orifice 116 in the frame 106. In assembly, the pin cap 101 (FIGS. 14, 15) of a lower piece first penetrates the key orifice 116 (FIG. 21) at the underside of the upper piece. As the piece being fitted is then slid downwardly, pin shank portions 102 slides within the key slot 114, but larger diameter pin shank portion 99 is captivated above the key follower slot (FIG. 15). Room for the pin heads 101 is provided by the clearance slots discussed previously. The relative tight fit captivates the lighting apparatus within the chamber 51, formed by mutually aligned central channels associated with abutting rail assembly parts. When the metal pins penetrate the glass panels or backplate, it is preferred that they be fitted with a protective plastic tube 104 (FIG. 15) that protects the glass.

Figure 5:
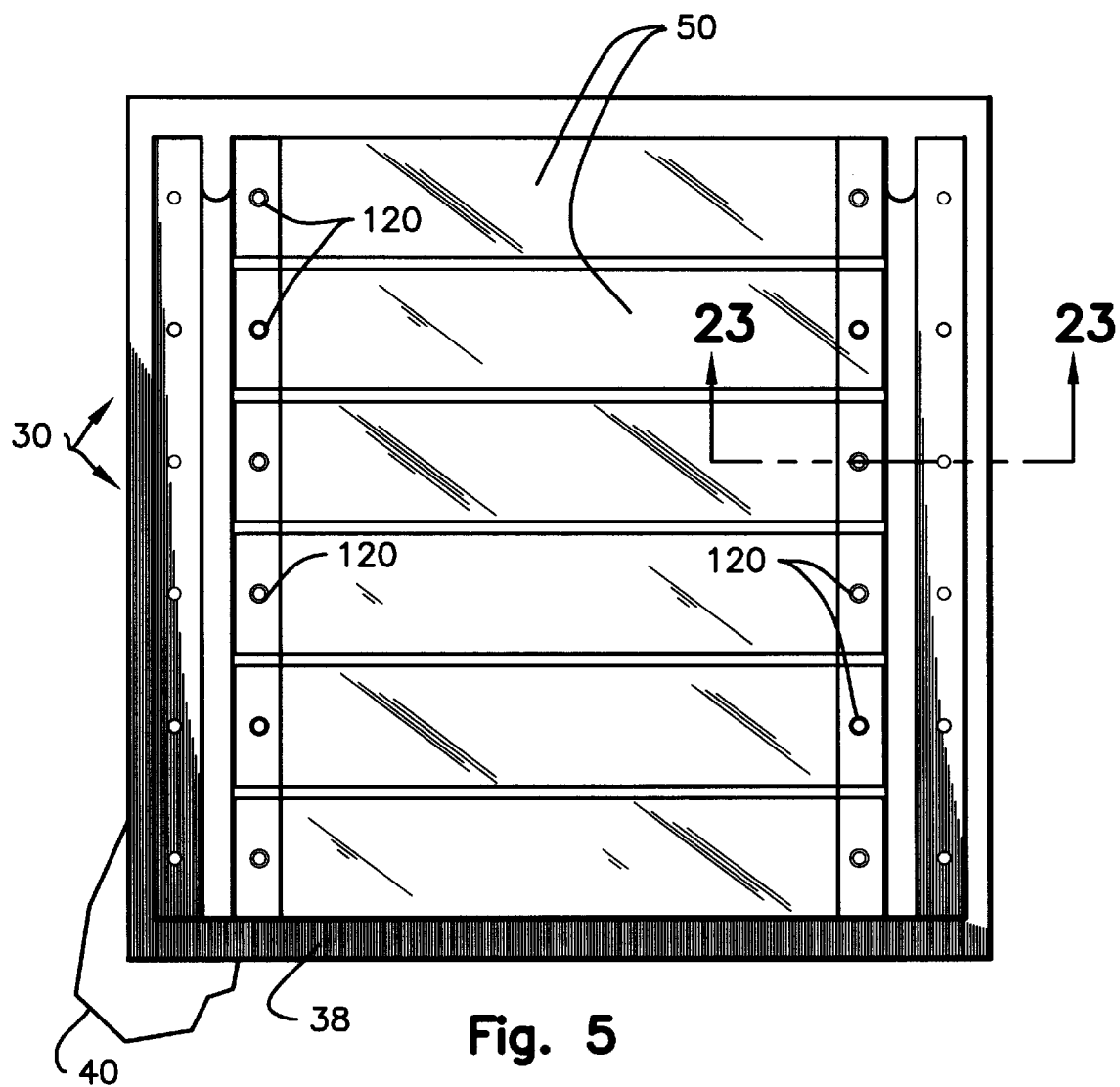
FIG. 5 is a front plan view of the rack showing it partially disassembled with the external trim pieces removed.
Figure 6:
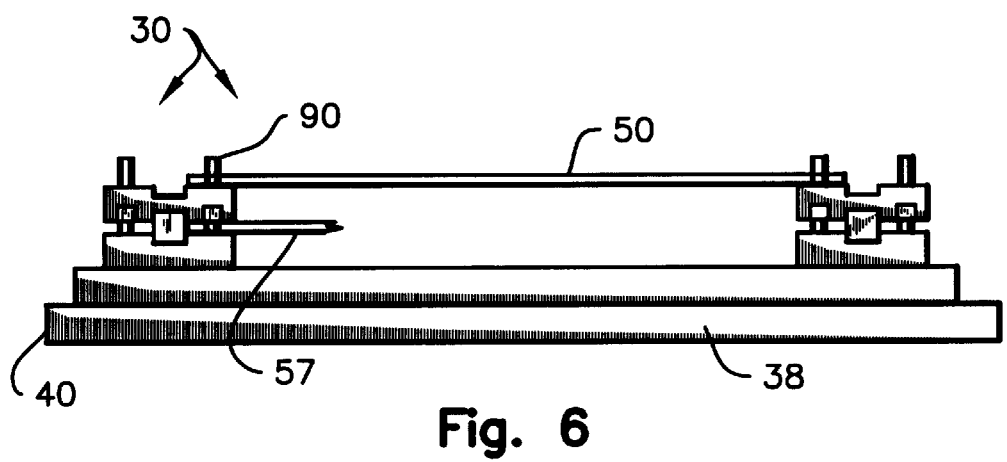
FIG. 6 is a fragmentary bottom plan view taken generally from the bottom of FIG. 5 and looking up.
Figure 22:
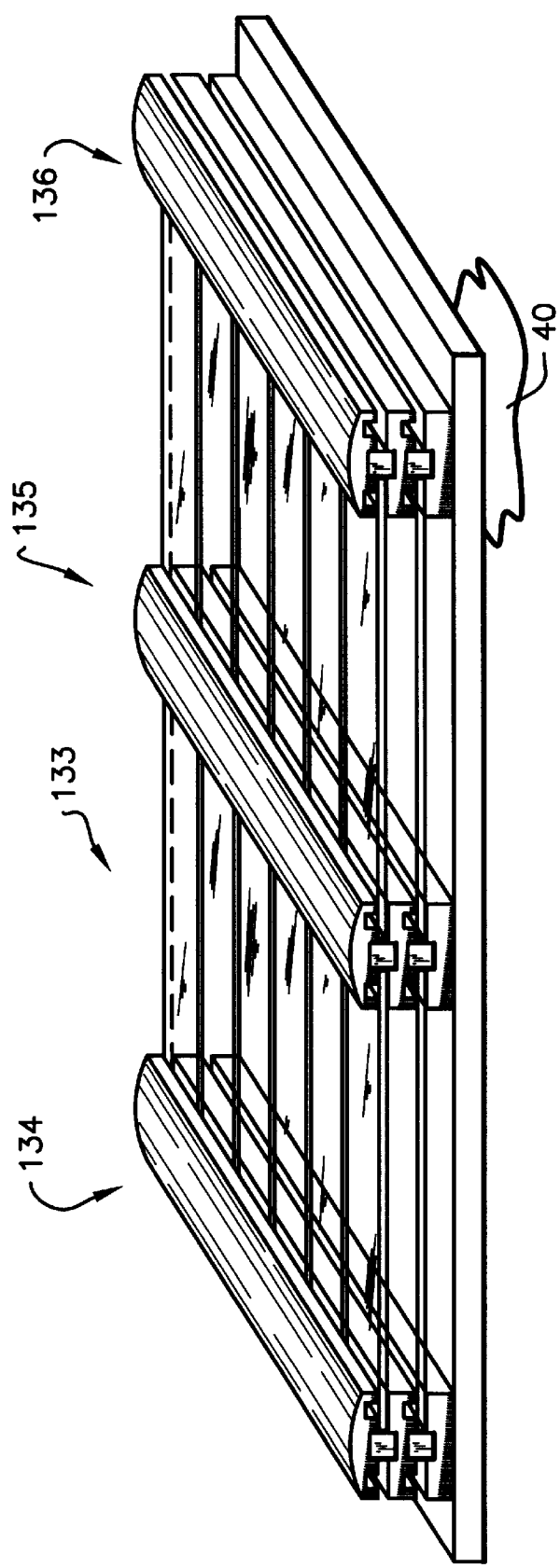
FIG. 22 shows an alternative, enlarged system in which more than two rail assemblies are employed, i.e., two racks constructed as shown are functionally mounted together in a side-by-side arrangement.

The panels overlie exposed top surfaces of the rail (FIG. 5). The edges of the panels have mounting orifices 120 defined in them for penetration by both the locking pins 90 discussed previously, and the more numerous pegs 77 (FIG. 23) that occupy rows coincident with the various clearance channels discussed, and aligned with the less numerous metal locking pins 90. FIG. 23 reveals perforate edge portions of a panel 50 and the optional backplate 57 that are penetrated and locked by pegs 77. The design seen in FIG. 23 employs a pair of rail assemblies 44 or 46, so no panel or backplate portions extend to left (i.e., as viewed in FIG. 23). Despite this, the pegs 77 at the left can balance the unit. However, FIG. 22 shows an alternative display system 133 comprising three rail assemblies, 134, 135, and 136. In this arrangement pegs 77 associated with rail assembly 135 would secure perforated panel or backplate edges at each side of the rail assembly.

With joint reference now to FIGS. 16–20 and 23, the lighting system 52 preferably uses fiber optics. An external light source (not shown) transmits light through a fiber bundle 140 comprising a plurality of individual fiber optic conductors 142. These enter the back of an elongated, light stick 144 that is disposed within the cavity 51 previously described that is formed from mutually abutting and aligned central channels in the various rails, tops etc. Light stick 144 comprises square aluminum tubing, formed from coupled, half portions 144A and 144B (FIG. 17). Within the housing individual optic fibers such as fiber 149 (FIGS. 17, 19) are fitted into a suitable orifice 156 in the tubing side 150 of the light stick (FIG. 19). The section through the light stick also shows how a single light conducting fiber is placed in the 0.030 inch orifice 156 pointing towards the edge of the adjacent glass panel 50. This is a preferred arrangement for directing the light beam into the glass. Noting the position of the light sticks captivated with the rail assemblies (FIG. 20), a light beam pictorially designated by numerals 161, 162 is aimed at the edges of the captivated panels 50 or backplates 57. When less light is required, various ones of the orifices 156 (FIG. 16) can be taped off as desired.

In the best mode the standard rack height will be 25 inches for eight single sized panels, 47 inches for sixteen panels, plaques and 71.75 inches for twentyfour panels. The preferred panel size is 2.5 inches high for the single size and 5.25 inches for the double size. The optional backplate width will be 12.5 inches viewable glass width. These dimensions can be altered to custom sizing per customer request. At this time, Walnut, Maple and Mahogany are the woods of choice, with the foremost visible part (i.e., the trim piece) having at least three different decorative profiles. The "Contemporary" trim piece profile is seen in FIGS. 1 and 26. The "Classic" profile is seen in FIG. 24, and the "Facet" profile is illustrated in FIG. 25.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A modular display rack comprising:
a pair of sides:
a plurality of elongated, spaced apart, parallel rail assemblies adapted to be secured to a supporting surface, each rail assembly comprising:
a shoe mounted to said supporting surface;
a decorative, trim piece for covering a shoe and fastened thereto; and,
a rail fastened to said shoe and disposed between said shoe and said trim piece;
at least one elongated cavity defined in said rail assemblies;
a plurality of panels extending between said rail assemblies that are spaced above said supporting surface, each panel comprising edges captivated between portions of the rail assemblies; and,
lighting means disposed within said at least one cavity for directing light towards panel edges for illumination.

2. The display rack as defined in claim 1 wherein said lighting means comprises elongated light sticks with fiber optic conductors.

3. The display rack as defined in claim 1 wherein:
each shoe comprises a bottom facing said supporting surface, and a top comprising a central channel;
each rail comprises a bottom facing said shoes, said bottom comprising a central channel aligned with the channel in the adjacent shoe thereby forming a first elongated cavity;
each trim piece comprises a bottom facing a rail and a decorative, outermost top, said bottom comprising a central channel aligned with the upper channel in the adjacent rail thereby forming a second elongated cavity; and,
said light stick means comprises a separate light stick disposed within said first and second cavities in each rail assembly.

4. The display rack as defined in claim 1 wherein:
each shoe is mounted to said supporting surface and comprises a plurality of upwardly projecting pins;
each rail is pinned to a lower shoe, and each rail comprises a plurality of upwardly projecting pins; and,
each decorative trim piece is pinned to a rail.

5. The display rack as defined in claim 4 edges of each panel are perforated to engage pins projecting upwardly from said shoes or said rails.

6. The display rack as defined in claim 4 further comprising key means rigidly fastened to said rails and said trim pieces to mate with projecting pins for fastening the rail assemblies together.

7. The display rack as defined in claim 6 wherein:
the pins projecting from each shoe are disposed in orderly, spaced apart rows disposed on each side of the shoe central channel;
each rail comprises a pair of elongated, spaced apart and parallel clearance slots defined on its bottom at either side of the bottom channel and aligned with the spaced apart rows of pegs or pins on the shoes, and a pair of spaced apart rows of pegs or pins defined on its top at either side of the top channel and aligned with the spaced apart rows on the shoes; and,
each trim piece comprises a pair of elongated, spaced apart and parallel clearance slots defined on its bottom at either side of its bottom channel and aligned with the spaced apart rows of pegs or pins.

8. The display rack as defined in claim 1 further comprising a backplate extending between said spaced-apart rail assemblies, the backplate comprising edges captivated by the rail assemblies.

9. The display rack defined in claim 8 wherein said rail assembly further comprises a rail fastened to said shoe and disposed between said shoe and said trim piece.

10. The display rack defined in claim 9 further comprising lighting means disposed within said at least one cavity for directing light towards panel edges for illumination, wherein said lighting means comprises elongated light sticks with fiber optic conductors.

11. A modular display rack comprising:
a plurality of elongated, spaced-apart, rail assemblies adapted to be secured to an existing wall or a baseboard in parallel, spaced-apart relation, each rail assembly comprising:
a shoe mounted to said supporting surface, each shoe comprising projecting pins;
a rail pinned to a shoe, each rail comprising a plurality of projecting pins;
a decorative, trim piece for covering a rail and pinned thereto; and,
at least one elongated cavity defined in said rail assembly; and,
at least one panel extending between said spaced-apart rail assemblies that is secured in parallel, spaced-apart relation relative to said baseboard, each panel comprising edges captivated by the rail assemblies.

12. The display rack as defined in claim 11 further comprising a backplate beneath said panels and extending between said spaced-apart rail assemblies, the backplate comprising edges captivated by the rail assemblies.

13. The display rack as defined in claim 12 wherein edges of each panel and said backplate are perforated to engage upwardly projecting pins.

14. The display rack as defined in claim 11 further comprising lighting means disposed within said at least one cavity for directing light towards panel edges for illumination.

15. The display rack as defined in claim 14 wherein said lighting means comprises elongated light sticks with fiber optic conductors, a separate light stick disposed within one or more of the cavities in each rail assembly.

16. The display rack as defined in claim 11 wherein:
each shoe comprises a bottom facing said supporting surface, and a top comprising a central channel;
each rail comprises a bottom facing said shoes, said bottom comprising a central channel aligned with the channel in the adjacent shoe thereby forming a first elongated cavity; and,
each trim piece comprises a bottom facing a rail and a decorative, outermost top, said bottom comprising a central channel aligned with the channel in the adjacent rail thereby forming a second elongated cavity.

17. The display rack as defined in claim 16 further comprising key means rigidly fastened to said rails and said trim pieces to mate with projecting pins for fastening the rail assemblies together.

18. The display rack as defined in claim 16 wherein:
the pins projecting from each shoe are disposed in orderly, spaced apart rows disposed on each side of the shoe central channel;
each rail comprises a pair of elongated, spaced apart and parallel clearance slots defined on its bottom at either side of the bottom channel and aligned with the spaced apart rows on the shoes, and a pair of elongated, spaced apart and parallel rows of pegs and pins defined on its top at either side of the top channel and aligned with the spaced apart rows on the shoes; and, each trim piece comprises a pair of elongated, spaced apart and parallel clearance slots defined on its bottom at either side of its bottom channel and aligned with the spaced apart channels on the bottom of the rails for clearance of the pegs and pins projecting from the rails; and, the display rack comprises key means rigidly secured within said rail bottom clearance slots and within the bottom clearance slots of said trim pieces to mate with projecting pins for fastening the rail assemblies together.

19. A modular display rack comprising:

a baseboard comprising a pair of sides:

a plurality of elongated, spaced-apart, rail assemblies adapted to be secured to a said baseboard in parallel relation, each rail assembly comprising:
- a shoe mounted to said baseboard, each shoe comprising upwardly projecting pins;
- a rail stack comprising at least one rail pinned at the bottom of the stack to a shoe, each rail comprising a plurality of projecting pins at its top and first key means at its bottom to engage pins beneath it;
- a trim piece pinned to the rail stack, said trim piece comprising second key means at its bottom to engage pins beneath it; and,
- a plurality of elongated cavities defined in said rail assembly;

a plurality or layers of multiple panels extending between said spaced-apart rail assemblies that are secured in parallel, spaced-apart relation relative to said baseboard, each panel comprising edges captivated by the rail assemblies;

lighting means disposed within said cavities for directing light towards panel edges for illumination.

20. The display rack as defined in claim 19 wherein:

each shoe comprises a bottom facing said supporting surface, and a top comprising a central channel;

the rail stack comprises a bottom facing said shoes, said bottom comprising a central channel aligned with the channel in the adjacent shoe thereby forming a first elongated cavity;

each trim piece comprises a bottom facing a rail stack and a decorative, outermost top, said bottom comprising a central channel aligned with the channel in the adjacent rail thereby forming a second elongated cavity; and, said light stick means comprises a separate light stick disposed within said first and second cavities in each rail assembly.

21. The display rack as defined in claim 20 wherein:

the pins projecting from each shoe are disposed in orderly, spaced apart rows disposed on each side of the shoe central channel;

each rail in the stack of rails comprises a pair of elongated, spaced apart and parallel clearance slots defined on its bottom at either side of the bottom channel and aligned with the spaced apart rows on the adjacent rails, and a pair of elongated, spaced apart and parallel clearance slots defined on its top at either side of the top channel and aligned with the spaced apart rows on the adjacent rails; and, each trim piece comprises a pair of elongated, spaced apart and parallel clearance slots defined on its bottom at either side of its bottom channel and aligned with the spaced apart channels on the rails; and, wherein the fist and second key means are rigidly secured within said rail bottom clearance slots and within the bottom clearance slots of said trim pieces respectively to mate with projecting pins for fastening the rail assemblies together.

22. The display rack as defined in claim 19 wherein said lighting means comprises elongated light sticks with fiber optic conductors.

23. The display rack as defined in claim 22 further comprising at least one backplate substantially coextensive with said baseboard disposed beneath said panels and extending between spaced-apart rail assemblies, the backplate comprising edges captivated by the rail assemblies.

24. The display rack as defined in claim 23 wherein edges of each panel and said backplate are perforated to engage upwardly projecting pins.

* * * * *